C. J. NELSON.
DISK SEEDER.
APPLICATION FILED JUNE 14, 1909.
960,576.
Patented June 7, 1910.
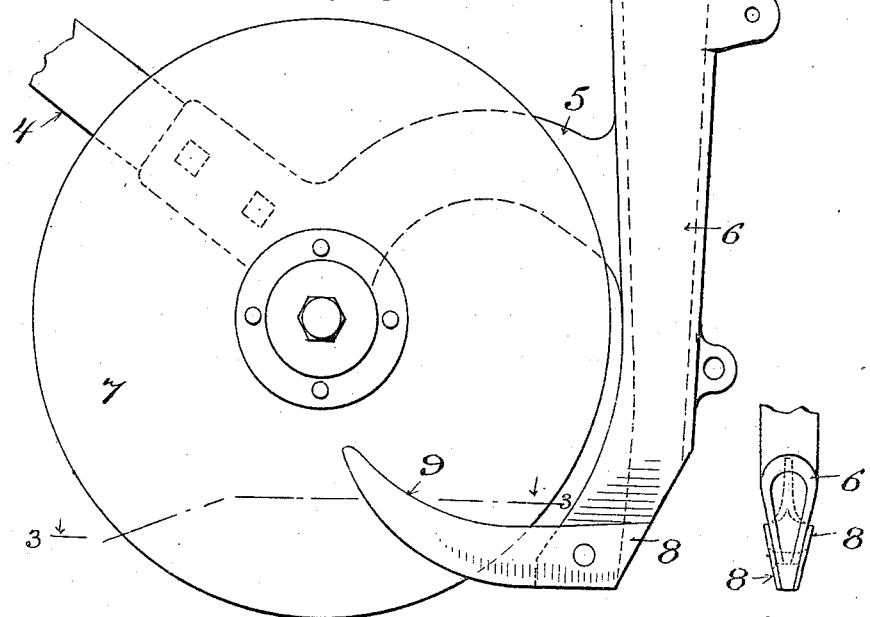
Fig. 1.
Fig. 2.
Fig. 3.

UNITED STATES PATENT OFFICE.

CARL J. NELSON, OF NORTH MILWAUKEE, WISCONSIN.

DISK SEEDER.

960,576.  Specification of Letters Patent.  Patented June 7, 1910.

Application filed June 14, 1909. Serial No. 501,942.

*To all whom it may concern:*

Be it known that I, CARL J. NELSON, a citizen of the United States, and resident of North Milwaukee, in the county of Milwaukee and State of Wisconsin, have invented certain new and useful Improvements in Disk Seeders; and I do hereby declare that the following is a full, clear, and exact description thereof.

My invention consists in what is herein particularly set forth with reference to the accompanying drawings and pointed out in claim, its object being to insure the making of clean furrows opened by rotatory disks of grain-drills of the type commonly known as disk-seeders.

Figure 1 of the drawings represents a side elevation of a grain-drill furrow-opening disk in connection with a seed-delivery boot that is provided with an attachment, in accordance with my invention, having the double function of a disk-scraper and plow; Fig. 2, a rear view of the plow and a fragment of the boot therewith, and Fig. 3, a horizontal section of the disk and a portion of the aforesaid attachment on the plane indicated by line 3—3 in Fig. 1, the remainder of said attachment being viewed in plan.

Referring by numerals to the drawings, 4 indicates a fragment of a drag-bar fastened to a forwardly extending arm 5 of a seed-delivery boot 6 of a grain-drill, and a rotatory furrow-opening disk 7 is suspended in connection with said arm, as is common in the art. The boot has the sides thereof beveled at its lower end, and matching the beveled portions of said boot are rearwardly divergent integral plow branches 8 of an upwardly curved and pointed blade 9 that constitutes a scraper for one side of the disk 7. The plow-branches of the blade are riveted or otherwise rigidly secured to the lower end of the boot that runs in the disk-furrow said blade being otherwise free, and by means of said plow-branches astraddle of said boot trash is prevented from falling into said furrow that is of approximately V-shape and its sides so packed, by the boot-attachment herein shown and described, that there is no crumbling of earth therein ahead of the boot itself, this keeping of trash and earth out of furrows ahead of the aforesaid boot being of important advantage in seeding.

It is to be noted that the attachment aforesaid has no function of a seed-shoe, the seed being delivered directly from the boot back of said attachment that constitutes a combined disk-scraper and plow.

I claim:

In a disk-seeder the combination of a furrow-opening disk, a seed-delivery boot having the sides thereof beveled at its lower end, and a furrow-protector in the form of a single upwardly curved blade constituting a scraper for one side of the disk and provided with integral rearwardly divergent plow-branches matching the beveled portions of the boot to which they are fastened, said blade being otherwise free.

In testimony that I claim the foregoing I have hereunto set my hand at Milwaukee, in the county of Milwaukee and State of Wisconsin in the presence of two witnesses.

CARL J. NELSON.

Witnesses:
N. E. OLIPHANT,
GEORGE G. FELBER.